United States Patent [19]

Kudo

[11] Patent Number: 4,865,638
[45] Date of Patent: Sep. 12, 1989

[54] GLASS SHEET BENDING APPARATUS

[75] Inventor: Masashi Kudo, Yokohama, Japan

[73] Assignee: Asahi Glass Company Ltd., Tokyo, Japan

[21] Appl. No.: 216,017

[22] Filed: Jul. 7, 1988

[30] Foreign Application Priority Data

Jul. 7, 1987 [JP] Japan .................................. 62-169393

[51] Int. Cl.[4] ............................................. C03B 23/02
[52] U.S. Cl. ....................................... 65/273; 65/104; 65/106; 65/289; 65/290
[58] Field of Search .................. 65/104, 106, 273, 289, 65/290

[56] References Cited

U.S. PATENT DOCUMENTS

| | | | |
|---|---|---|---|
| 4,204,854 | 5/1980 | McMaster et al. | 65/104 X |
| 4,222,763 | 9/1980 | McMaster . | |
| 4,386,952 | 6/1983 | Nitschke | 65/104 X |
| 4,661,141 | 4/1987 | Nitschke et al. . | |
| 4,682,997 | 7/1987 | Halberschmidt et al. | 65/106 |

Primary Examiner—Arthur Kellogg
Attorney, Agent, or Firm—Oblon, Spivak, McClelland, Maier & Neustadt

[57] ABSTRACT

A glass sheet bending apparatus which includes a transferring mechanism for transferring to the heating furnace a glass sheet heated to a temperature capable of processing while keeping a horizontal posture, a mold having a curved surface with which the glass sheet is to be bend-shaped, the mold being arranged at a position corresponding to the processing stage, a provisional shaping mechanism for provisionally shaping the glass sheet by closely contacting it on a generally curved surface in the mold excluding a deep-bending surface which corresponds to a deep-bent portion in the glass sheet, and a blow-bending device for blowing compressed air to the deep-bending surface of the mold to bend part of the glass sheet so as to correspond to the deep-bending surface.

9 Claims, 15 Drawing Sheets

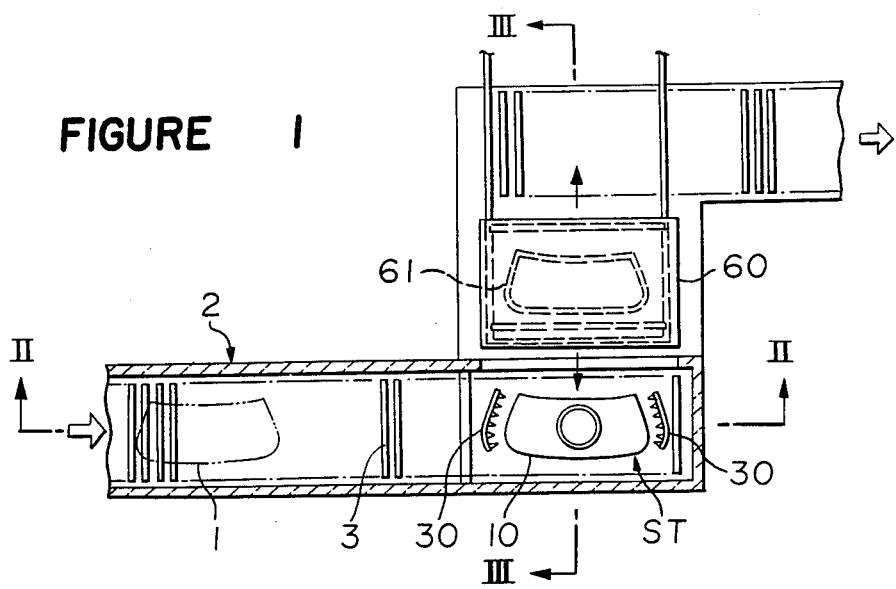
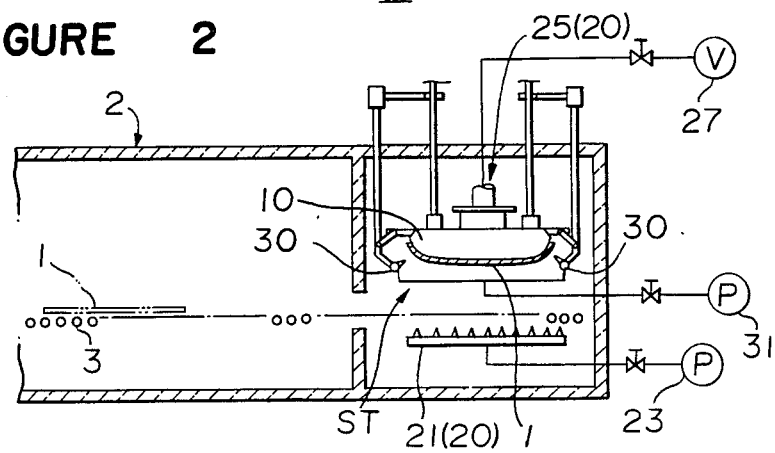
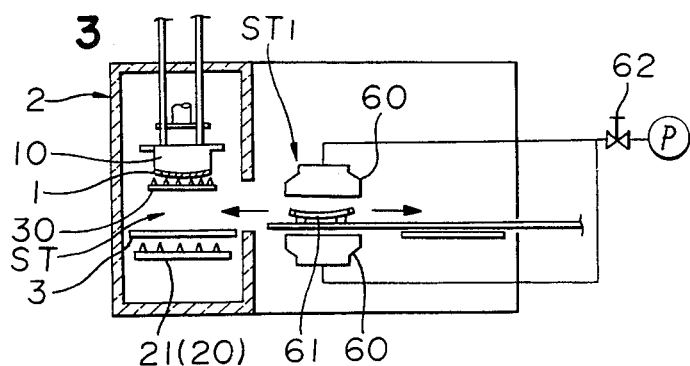

(b)

(a)

GLASS SHEET BENDING APPARATUS

BACKGROUND OF THE INVENTION

1. Field of the Invention:

The present invention relates to a glass sheet bending apparatus for bending a glass sheet at a processing stage in a heating furnace. Particularly, it relates to an improvement in a glass sheet bending apparatus suitable for deep-bending a side of a glass sheet.

2. Discussion of the Background:

There has been known the so-called a horizontal furnace pressing system as a system for bending a glass sheet (Japanese Unexamined Patent Publication 132528/1986). In such system, a glass sheet is heated at a temperature of about 200° C.–650° C. at a bend-processing stage in a heating furnace to bend it into a given curved form; the curved glass sheet is transferred to a cooling stage outside the heating furnace; cooling air is blasted to the curved glass sheet at the cooling stage to temper it, and then the tempered curved glass sheet is removed.

In the above-mentioned system wherein a glass sheet is bent at a high temperature in the heating furnace, it is possible to bend the glass sheet to have a complicated shape because the glass sheet is easily deformed under a high temperature condition in comparison with a system that a glass sheet is bent outside a heating furnace. Further, the system is advantageous in that since the glass sheet is bent in the heating furnace, reduction in temperature is small during the bending operation in comparison with the system that the bending operation is carried out outside the heating furnace. Accordingly, when the glass sheet after bending is subjected to a cooling operation to temper it, the initial temperature can be increased to thereby be able to give a sufficient strength.

There is a publication of, for instance, Japanese Unexamined Patent Publication 178329/1985 which discloses a conventional glass sheet bending apparatus used for the horizontal furnace pressing system. Such bending apparatus is constituted in such a manner as that shown in FIG. 22, a conveyor 3 is arranged in a heating furnace 2 to transfer a glass sheet 1 to a bending stage ST while keeping its horizontal posture; a vacuum suction type mold 4 having a shaping surface which corresponds to the shape of the glass sheet 1 to be shaped is disposed so as to be vertically movable at a place corresponding to the bend-processing stage ST; a lift jet device 5 is disposed below the bend-processing stage ST to blow up an air stream; and a press ring 6 is arranged in the heating furnace 2 adjacent to the bend-processing stage ST so as to be capable of being forwarded and retracted, whereby the glass sheet 1 is bent in the bend-processing stage ST. As the pressing ring 6, there is used, for instance, one comprising a fixed press ring portion 6a having a radius of curvature corresponding to a generally curved surface 4a in the mold 4 and a movable press ring portion 6b having a radius of curvature corresponding to a deep-bending surface 4d in the mold 4 which is connected to the side portion of the fixed press ring portion 6a by a hinge 7.

In the glass sheet bending apparatus, when a heated glass sheet 1 in a flat shape is positioned on the bend-processing stage ST, the mold 4 is descended onto the glass sheet 1, and then air is blown from the lift jet in association with a sucking action by the mold 4. Then, the glass sheet 1 is temporarily shaped on the generally curved surface 4a of the mold 4. The mold 4 is ascended while it keeps the glass sheet 1 thereon. Then, the press ring 6 is forwarded from its waiting position to the bend-processing stage ST so that the movable press ring portion 6b of the press ring 6 presses the side of the glass plate 1 onto the deep-bending surface 4b of the mold 4. As a result, the glass sheet 1 is finally shaped so as to have the finally shaped configuration.

However, when the side portion of the glass sheet 1 is bent by the above-mentioned conventional glass sheet bending apparatus, there is caused relative slide-contact between the movable press ring portion 6d and the side portion of the glass sheet 1 because the radius of curvature of the deep-bending surface 4b is relatively large. Accordingly, scratches may be result in the side portion of the glass sheet 1 to which the movable press ring portion 6d is in a contact resulting in reduction of the quality of the shaped glass sheet 1.

SUMMARY OF THE INVENTION

It is an object of the present invention to provide a glass sheet bending apparatus capable of deep-bending a side portion of a glass sheet while avoiding occurrence of scratches in the side portion which causes a reduction of the quality.

The foregoing and the other objects of the present invention have been attained by providing a glass sheet bending apparatus for deep-bending a side of a glass sheet at a processing stage in a heating furnace which comprises a transferring means for transferring to the heating furnace the glass sheet heated to a temperature capable of processing while keeping a horizontal posture, a mold having a curved surface with which the glass sheet is to be bend-shaped, the mold being arranged at a position corresponding to the processing stage, a provisional shaping means for provisionally shaping the glass sheet by closely contacting it on a generally curved surface in the mold excluding a deep-bending surface which corresponds to a deep-bent portion in the glass sheet, and a blow-bending means for blowing compressed air to the deep-bending surface of the mold to bend part of the glass sheet so as to correspond to the deep-bending surface.

It is another aspect of the present invention to provide a glass sheet bending apparatus having a press-bending means operable after finishing a bending operation by a blow-bending means so that a side portion of a glass sheet is pressed to the keep-bending surface, in addition to the structural elements as defined in the above-mentioned invention.

As to the above-mentioned transferring means, it is not limited to a continuous type conveyor such as a number of transferring rollers or a transferring belt having heat resistance, but may be a truck movable between the bend-processing stage and an initially setting position as far as it can transfer a heated glass sheet. The transferring means may be provided with a position determining unit which is so constructed that, for instance, the glass sheet is transferred to a position in the deep-bending stage by using a control system.

The mold may be designed as desired so long as it is provided with a shaping surface corresponding to the final configuration of the glass sheet by using a material durable to a shaping temperature in the heating furnace (about 600° C.–650° C.). As such heat resistant material, a sheet material made of stainless steel may be used. In this case, a plurality of pieces of stainless steel each having a radius of curvature corresponding to parts of the deep-bending surface of the mold are joined followed by grinding the surface of the joined plates for finishing. Ceramics having heat resistance properties may be used. In consideration of thermal deformation and processability after finishing, it is preferable that the mold is formed by casting cast iron having a high heat resistance such as stainless steel, heat-resistance steel, a high manganese cast iron, a high metal alloy and so on. Further, in consideration of light weight property, the mold may be formed by a heat resistance inorganic material such as calcium silicate, fiber ceramics, or a light castable ceramic material.

The mold should be so designed that the rigidity of the shaping surface is maintained by forming reinforcing ribs on the backside of the mold or by thickening the wall of the mold. Further, a coating layer made of a material such as glass fibers or another ceramic fibers may be incorporated in the shaping surface of the mold so as to obtain a function as a buffer layer.

The provisionally shaping means can be designed as desired so long as the glass sheet can be made in close-contact with the generally curved surface except for the deep-bending surface. For instance, when a hanging type mold is used, the provisionally shaping means may be provided with a sucking means for sucking a glass sheet to the mold and a lifting means for forcing the glass sheet torward the mold. When a stationary type mold is used, the mold may be provided with a sucking means.

The blow-bending means may be provided with a number of blowing nozzles or a single blowing duct so long as a blowing force is applied to the side of the glass sheet to bend it deeply. Such device may be installed at any desired position on the mold or the other element so long as it does not hinder the shaping operation to the glass sheet.

As to the press-bending means in the second invention, it may be designed as desired as far as the portion of the glass sheet to be deep-bent is strongly forced toward the mold. However, from the standpoint that the shaped glass sheet is free from damage such as a scratch, it is desired to utilize a partially movable type or fixed ring type press-bending device wherein only the edge portion of the glass sheet which is deep-bent is uniformly forced to the mold.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a plane view showing schematically an embodiment of the glass sheet bending apparatus according to the present invention;

FIG. 2 is a cross-sectional view taken along a line II—II in FIG. 1;

FIG. 3 is a cross-sectional view taken along a line III—III in FIG. 1;

DESCRIPTION OF THE PREFERRED EMBODIMENTS

Figure 4:
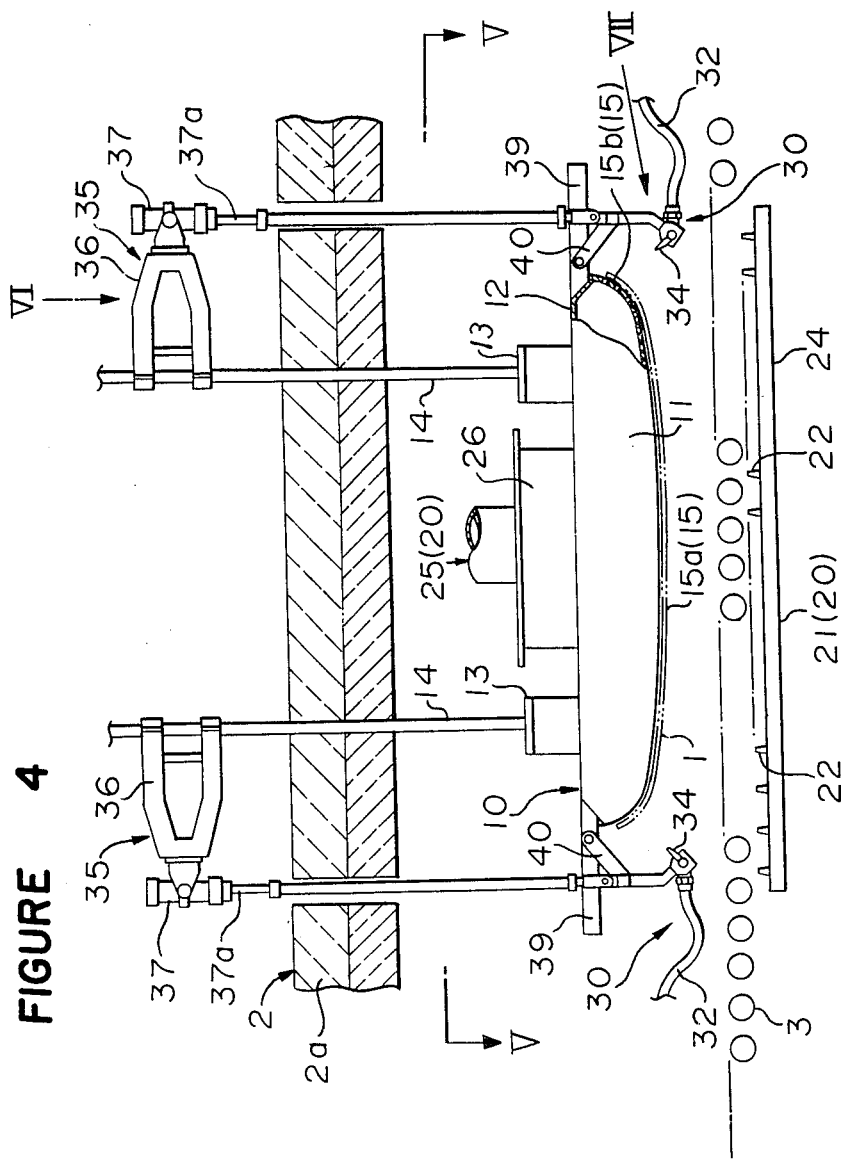
FIG. 4 is a front view partly cross-sectioned of an embodiment of the glass sheet bending apparatus according to the present invention.

Referring to the drawings, wherein the same reference numerals designate the same or corresponding parts throughout the several views, and more particularly to FIGS. 1 to 3 thereof, there is shown a first embodiment of the glass sheet bending apparatus for deep-bending both sides of a glass sheet in a heating furnace.

In FIGS. 1 to 3, a glass sheet 1 is transferred to a bend-processing stage ST by a conveyor 3 consisting of a number of transferring rollers which are provided in a heating furnace 2. A bending mold 10 for bend-shaping the glass sheet 1 is provided at an upper part in the bend-processing stage ST, and a provisionally shaping device 20 is placed in the bend-processing stage ST to provisionally shaping the glass sheet 1. Blow-bending devices 30 are also provided to effect deep-bending of both sides of the provisionally shaped glass sheet 1. A cool-processing stage ST 1 is provided outside the heating furnace 2 adjacet to the bend-processing stage ST to cool and temper the curved glass plate 1 which is bent by the bending device. Cooling devices 60 are respectively disposed at upper and lower parts in the cool-processing stage ST 1. The cooling devices 60 are respectively communicated with a blower 62. A quenching ring 61 having a shape corresponding to the shape of the curved glass plate 1 is disposed so as to be forwarded and retracted between the bend-processing stage ST and the cool-processing stage ST 1, whereby the curved glass sheet 1 shaped by the bending device is transferred to the cool-processing stage ST 1.

Figure 5:
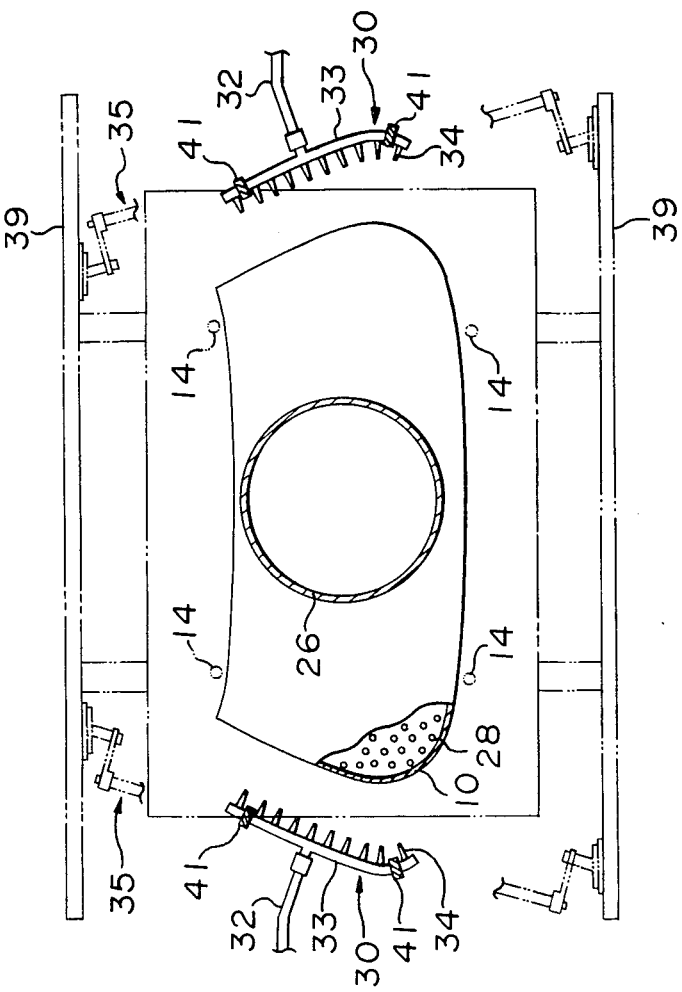
FIG. 5 is a cross-sectional view taken along a line V—V in FIG. 4.
Figure 6:
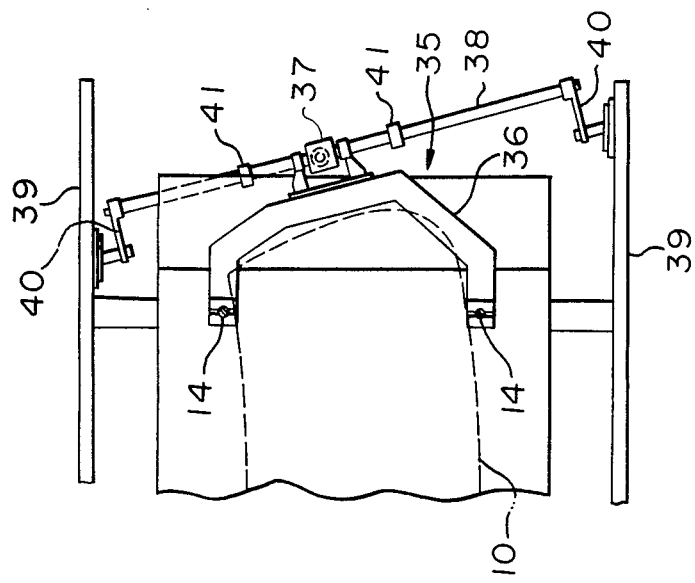
FIG. 6 is a diagram viewed from the direction of VI in FIG. 4.
Figure 7:
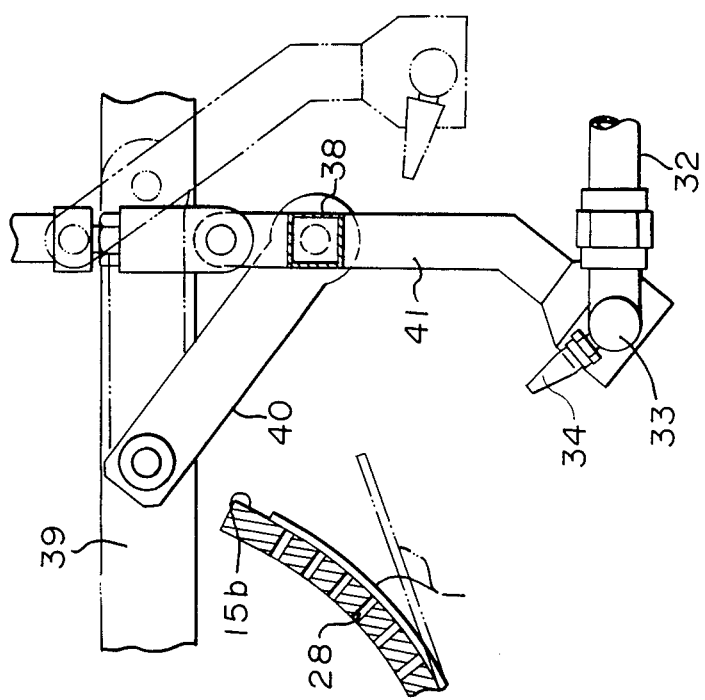
FIG. 7 is a diagram showing in detail the part indicated by VII in FIG. 4.

In this embodiment, the mold 10 is fabricated by joining several pieces of stainless steel plates having a heat resistant temperature of about 700° C. for instance. The mold 10 is constituted by a cup-shaped mold main body 11 and a back cover plate for closing the opening portion of the mold main body 11 as shown in FIGS. 4 and 5. The mold 10 is supported by a plurality of supporting rods 14 set up at appropreate positions on the backcover plate 12 so as to be movable in the vertical direction by means of brackets 13.

The mold main body 11 has a shaping surface corresponding to the shape of the glass sheet 1 bend-shaped, which consists of, for instance, a generally curved surface 15a having a gentle radius of curvature corresponding to the central portion of the shaped glass sheet 1 and deep-bent curved surfaces 15b having an acute radius of curvature corresponding to both sides of the glass sheet 1. The mold 10 is descended under a timing condition that a glass sheet 1 is set in the bend-processing stage ST; is ascended to the initial position as soon as the provisionally shaping device is 20 actuated; and is maintained at the initial position until a series of bending operations is finished. In FIG. 4, a reference numeral 2a designates a wall of the heating furnace 2.

The provisionally shaping device 20 comprises a lift jet device 21 disposed at the lower part of the bend-processing stage ST and a suction device 25 to cause an air sucking force at the shaping surface 15 in the mold 10. In this embodiment, the lift jet device 21 is constituted by a number of injection nozzles 22 arranged in the region corresponding to the glass sheet 1 when it is set at a predetermined position in the bent-processing stage ST. An air duct 24 communicates each of the injection nozzles 22 with a compressor 23 so that the compressor 23 is operated under a timing condition that a glass sheet 1 is set in the bend-processing stage ST. On the other hand, the suction device 25 is so constructed that a connecting duct 26 is formed at the central portion of the back cover plate 12 of the mold 10 to be communicated with a vacuum source 27 such a suction blower (FIG. 2); a number of apertures 28 are formed in the shaping surface 15 of the mold main body 11, whereby a sucking effect is obtainable by actuating the vacuum source 27 under the timing condition that the glass sheet 1 is set in the bend-processing stage ST.

The blow-bending device 30 is so constructed that as shown in FIGS. 4 to 7, a T-shaped blowing pipe 33 in which both ends of the T-shaped pipe are closed is connected to the free end of a pipe 32 which is, in turn, connected to the compressor 31; blowing nozzles 34 are attached with a predetermined pitch (about 25 mm–70 mm) to the blowing pipe 33 in its longitudinal direction, and the blowing pipe is supported by the mold 10 by means of a movable supporting means 35 so that each of the blowing nozzles 34 face the deep-bending surfaces 15d of the mold. In this embodiment, pressure to inject air through the blowing nozzles 34 is set at, for instance, about 8 kg/cm$^2$.

A pair of the movable supporting means 35 are provided, each having a supporting arm 36 fixed between a pair of supporting rods 14 of the mold 10. An air cylinder 37 is supported at the base portion of the supporting arm 36 so as to be slightly swingable, and an operating bar 38 is attached to the free end of the piston rod 37a of the air cylinder 37 so as to extend laterally. The operating bar 38 is supported at both ends by means of a pair of links 40 each one end of which is pivoted to each frame 39 which is fixedly attached to the mold 10, and the blowing pipe with blowing nozzles 34 is attached to the operating bar 38 by means of a pair of supporting brackets 41.

Figure 8A:
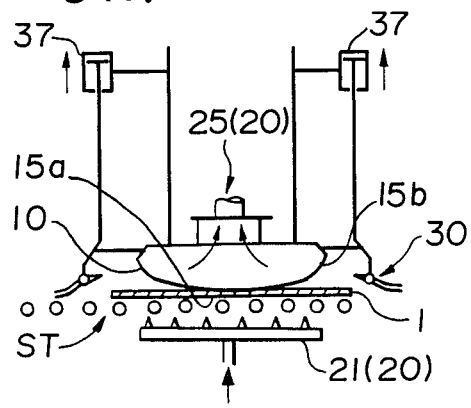
FIGS. 8a–8c are respectively diagrams showing the operations of the glass sheet bending apparatus of the present invention.
Figure 8B:
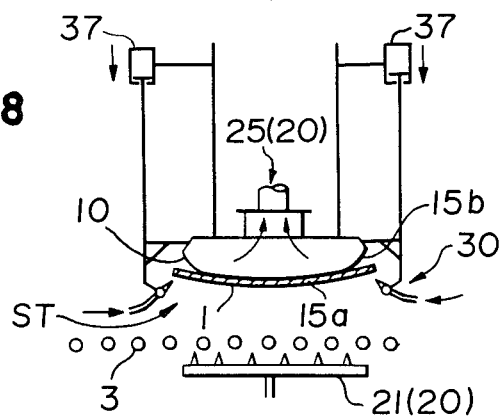

The air cylinder 38 used for this embodiment operates as follows. The air cylinder 37 is actuated for a predetermined time, specifically, a sufficient time (about 2 seconds–6 seconds) to complete deep-bending operations immediately after finishing of the provisional shaping operations by the provisionally shaping device 20. When the piston rod 37a is determined to be the retracting position, the blowing nozzles 34 are moved so as to separate from the deep-bending surface 15b of the mold 10 and at a position above the lowermost surface of the mold 10 as indicated by an imaginary line in FIG. 7. When the piston rod 37a of the air cylinder 37 is determined to be an advanced position, the blowing nozzles 34 are arranged facing the deep-bending surface 15d of the mold 10 as indicated by a solid line in FIG. 7. Accordingly, in accordance with the glass sheet bending apparatus of this embodiment, a flat glass sheet 1 is first transferred by the conveyor 3 to a predetermined position in the bend-processing stage ST. Then, the mold 10 is descended onto the flat glass sheet 1 as shown in FIG. 8a, and the lift jet device 21 and the suction device 25 which constitute the provisionally shaping device 20 are actuated. Then, the mold is ascended. In this case, there is no danger of interference of the blow-bending device 30 with the glass sheet 1 even when the mold 10 is descended because the blowing nozzles 34 of the blow-bending device 30 are located above the lowermost surface of the mold 10 as shown in FIG. 8a. When the provisionally shaping device 20 is operated, the central portion of the glass sheet 1 is sucked and maintained at the generally curved surface 15a of the mold 10 to be subjected to provisionally shaping as shown in FIG. 8b. In this case, since a sufficient blowing force and a sucking force do not act on the side portions of the glass sheet 1, the side portions of the glass sheet 1 may not come in close-contact with the deep-bending surfaces 15d although they approach toward the deep-bending surfaces 15b of the mold 10 as indicated by two-dotted chain line in FIGS. 8b and 9 (in comparison with the glass sheet having a flat shape as indicated by one-dotted chain line).

Figure 8C:
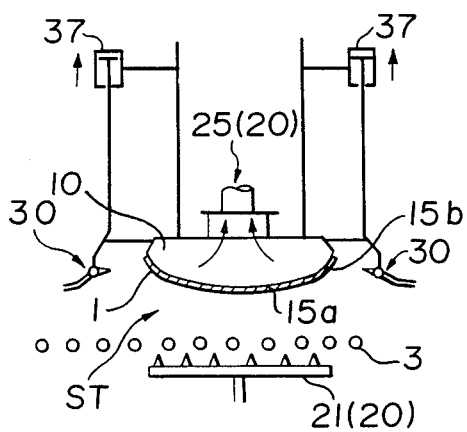
Figure 9:
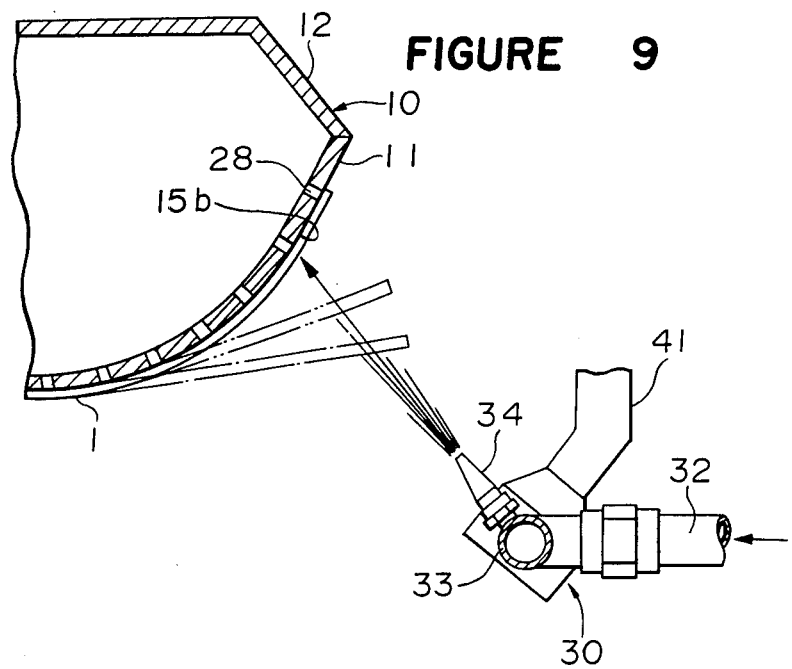
FIG. 9 is a diagram showing the operation by the blow-bending means used for an embodiment of the present invention.

Then, the blow-bending device 30 is actuated as shown in FIGS. 8b and 9. Namely, the piston rod 37a of the air cylinder 37 is extended, and at the same time, the compressor 31 is operated, whereby air is injected from the blowing nozzles 34 disposed at a position opposing the deep-bending surfaces 15b of the mold 10 to the side portions of the glass sheet 1. Then, the side portions of the glass sheet 1 are forced to the deep-bending surfaces 15b without causing defects such as scratches by the blowing force as indicated by a solid line in FIGS. 8c and 9, whereby the central portion and the side portions of the glass sheet 1 are shaped corresponding to the shaping surface of the mold 9; thus, the bending operations for the glass sheet 1 is finished at this stage.

Figure 10:
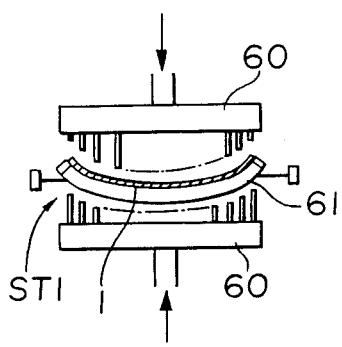
FIG. 10a and 10b are respectively diagrams showing the operation of bending a glass sheet at a cooling stage according to the present invention.
Figure 10:
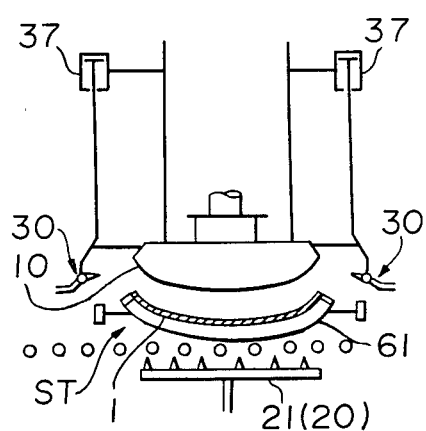

The glass sheet 1 after finishing the bending operations is separated from the mold 10 as shown in FIGS. 10a and 10b, and then it is supported by the quench ring 61 and introduced into the cool-processing stage ST 1 outside the heating furnace 2 where it is cooled and tempered by blowing and cooling air by the cooling device 60.

In this embodiment, nothing is required for the pipe 32 in the blow-bending device 30 except that the pipe 32 is loose in its length for the ascending and descending operations of the mold 10. The position of the blowing nozzles 34 can be freely adjusted so as to bend deeply the side portions of the glass sheet 1. Therefore, a stable deep-bending operation of the blow-bending device 30 is obtainable.

In this embodiment, it is desirable that compressed air ejected from the blowing nozzles 34 of the blow-bending device 30 and injection nozzles of the lift jet device 21 of the provisionally shaping means 20 is previously heated at a high temperature so as not to cool the glass sheet G by blasted air.

Figure 11:
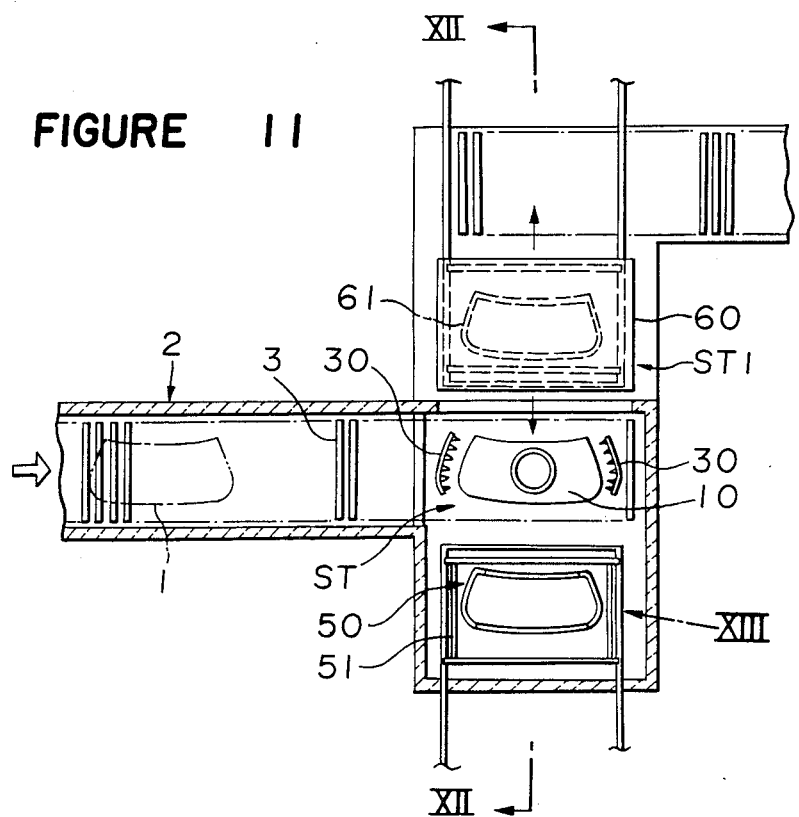
FIG. 11 is a plane view showing a second embodiment of the glass sheet bending apparatus according to the present invention.
Figure 12:
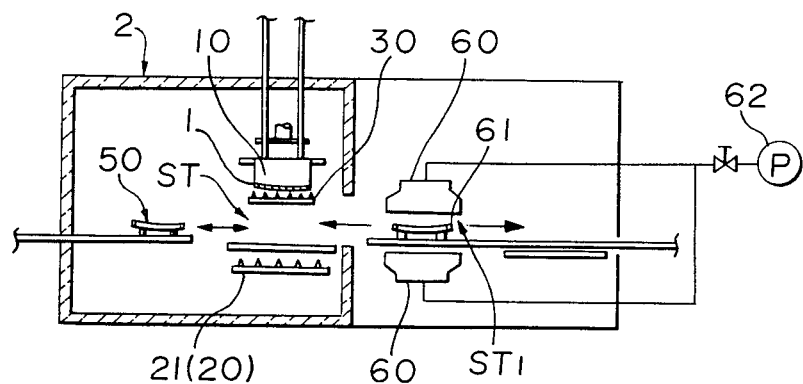
FIG. 12 is a cross-sectional view taken along a line XII—XII in FIG. 11.

FIGS. 11 and 12 show a second embodiment of the glass sheet bending apparatus. The basic construction of the second embodiment is the same as the first embodiment except that the apparatus is provided with a press-bending device which is actuated after the deep-bending operation by the blow-bending device 30.

Figure 13:
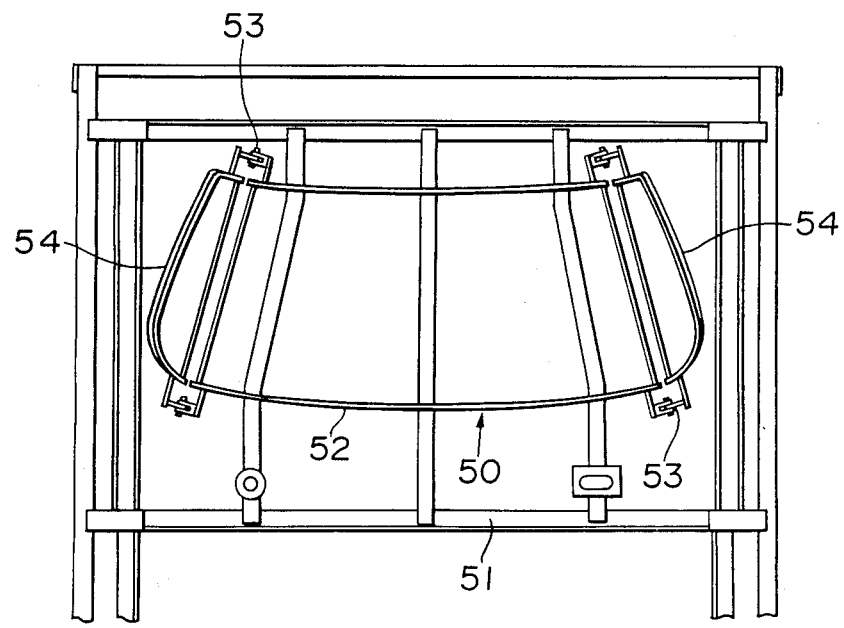
FIG. 13 is a diagram showing in detail the portion indicated by XIII in FIG. 11.
Figure 14:
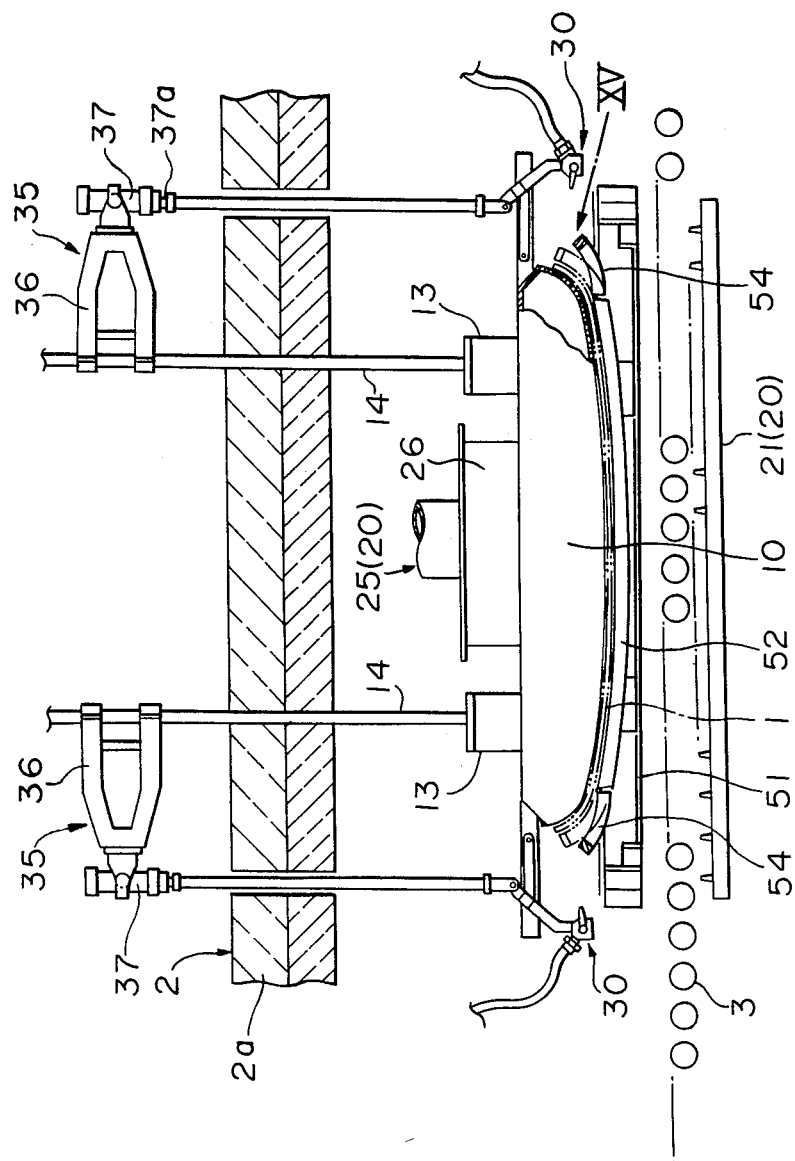
FIG. 14 is a front view partly cross-sectioned of an embodiment of the glass sheet bending apparatus according to the present invention.

In the second embodiment, the press-bending device 50 is installed on a shuttle truck 51 which is movable in the heating furnace 2 between the bend-processing stage ST and a waiting position. As shown in FIGS. 13 and 14, the press-bending device 50 is constituted by a fixed press ring 52 having the same radius of cuvature as the generally curved surface 15a of the mold 10 and a pair of movable press rings 54 which are connected to the both sides of the fixed press ring 52 by means of hinges 53 so as to be swingable, and which respectively have the same radius of curvature as the deep-bending surfaces 15d of the mold 10. The movable press rings 54 are moved to perform a swing mortion by an actuator (not shown). In the second embodiment, the shuttle truck 51 is moved to the bend-processing stage ST after the operation of the blow-bending device 30 is finished, and the movable press rings 54 are moved toward the deep-bending surfaces 15d of the mold 10 when the shuttle truck 51 is moved to the bend-processing stage ST.

Figure 15:
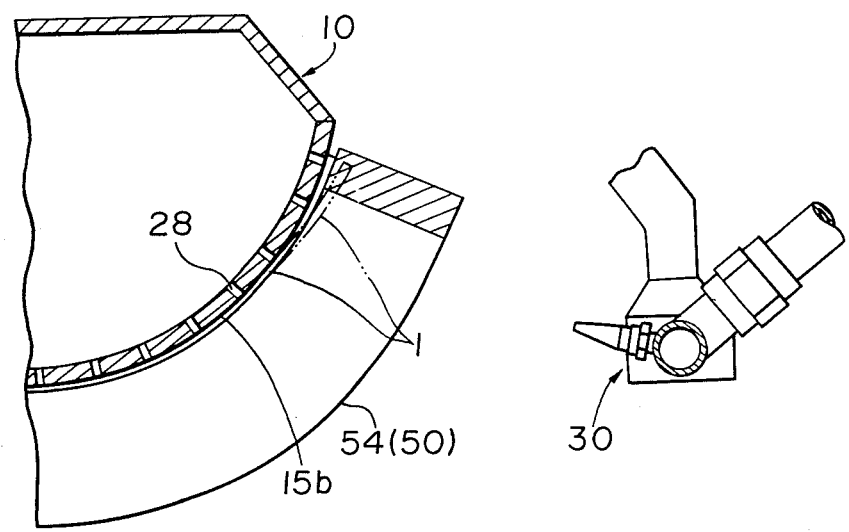
FIG. 15 is a diagram showing in detail the portion indicated by XV in FIG. 14.

In accordance with the second embodiment, the deep-bending operation is effected by the blow-bending means 30 after the glass sheet 1 is provisionally shaped in the same manner as first embodiment. In this case, when the deep-bending surfaces 15b of the mold 10 have an acute curve, it is difficult that the side portions of the glass sheet 1 do not come in close-contact with the deep-bending surfaces 15b. In the second embodiment, however, the movable press rings 54 function to forcibly press the side portions of the glass sheet 1 to the deep-bending surfaces 15b. Accordingly, the side portions of the glass sheet 1 slightly separated from the deep-bending surfaces 15b (as indicated by an imaginary line in FIG. 15) certainly come in close contact with the deep-bending surfaces 15b as indicated by a solid line in FIG. 15. In this case, the movable press rings 54 are in contact with the glass sheet 1. However, there is no danger of occurrence of scratches in the side portions of the glass sheet 1 because the quantity of displacement between the movable press rings 54 and the glass sheet 1 is small.

Figure 16:
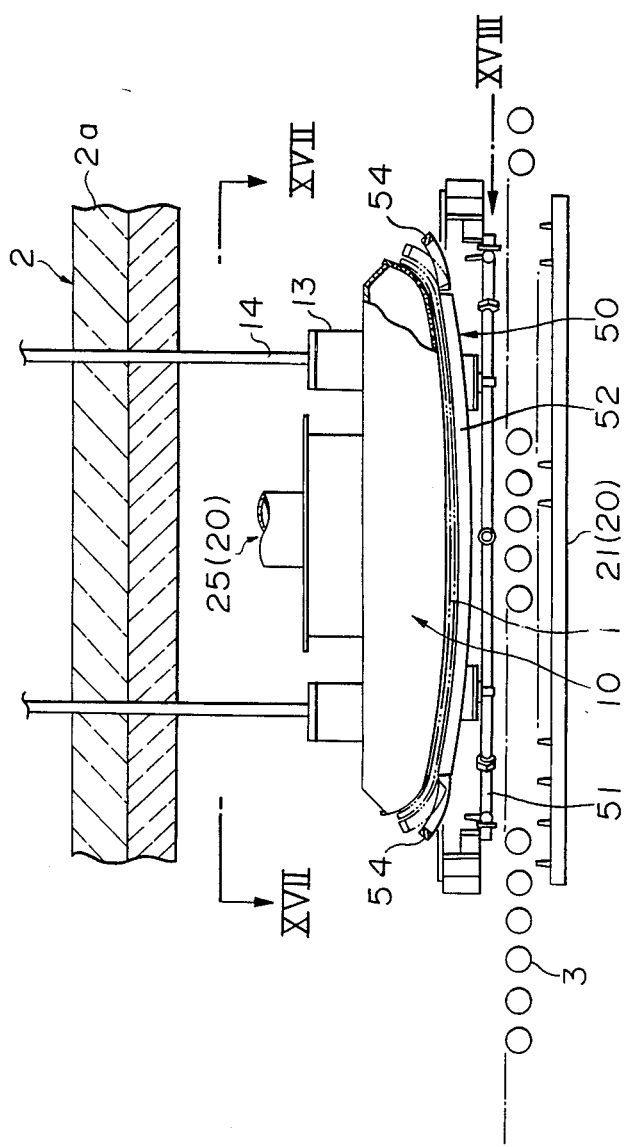
FIG. 16 is a front view partly cross-sectioned of another embodiment of the glass sheet bending apparatus of the present invention.
Figure 17:
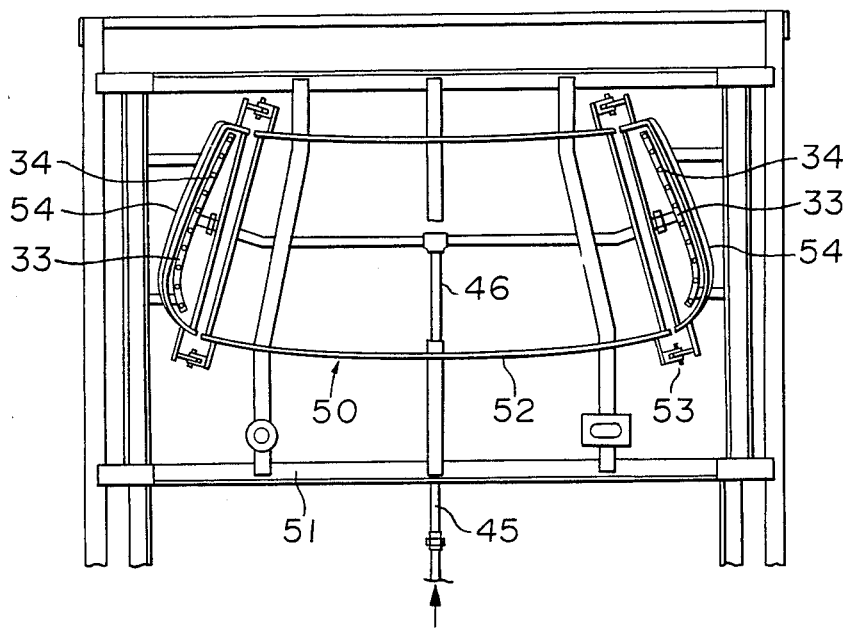
FIG. 17 is a cross-sectional view taken along a line XVII—XVII in FIG. 16.
Figure 18:
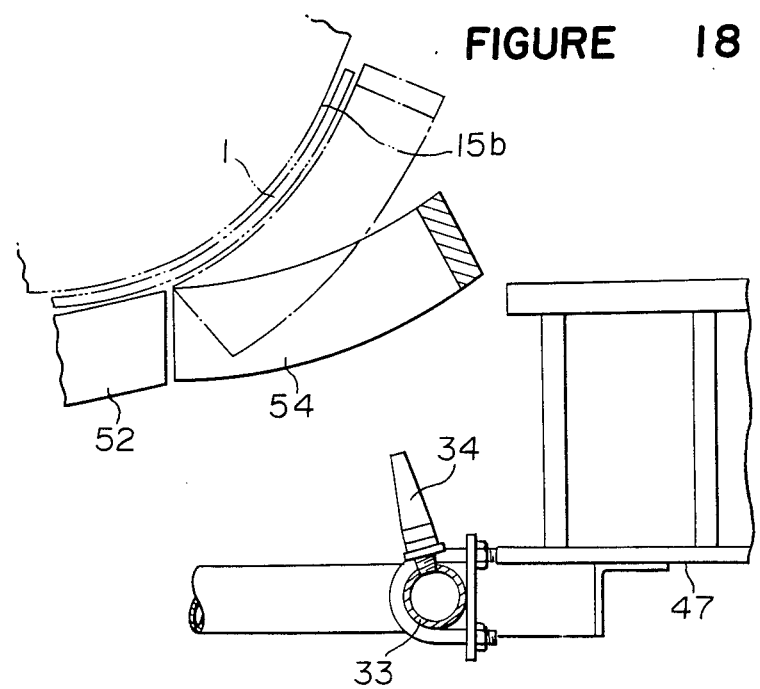
FIG. 18 is a diagram showing in detail the portion indicated by XVIII in FIG. 16.

FIGS. 16 to 18 show a third embodiment of the present invention. The basic construction of the third embodiment is as same as the second embodiment except that the construction of the blow-bending device 30 is somewhat different from that of the second embodiment.

A piping 45 connected to a compressor (not shown) is arranged on the shuttle truck 51, and a branch piping 46 is connected to the end of the piping 45. At both ends of the branch piping 46, blowing pipes 33 as used for the first and second embodiments are connected. Each of the blowing pipes 33 are fixed to the shuttle truck 51 by means of brackets 47. A number of blowing nozzles 34 are formed in the blowing pipes 33 to be directed to the deep-bending surfaces 15b of the mold 10.

In the third embodiment of the present invention, the general construction of the apparatus can be simple because the movable supporting mechanism 35 as used for the first and second embodiments is unnecessary.

Figure 19:
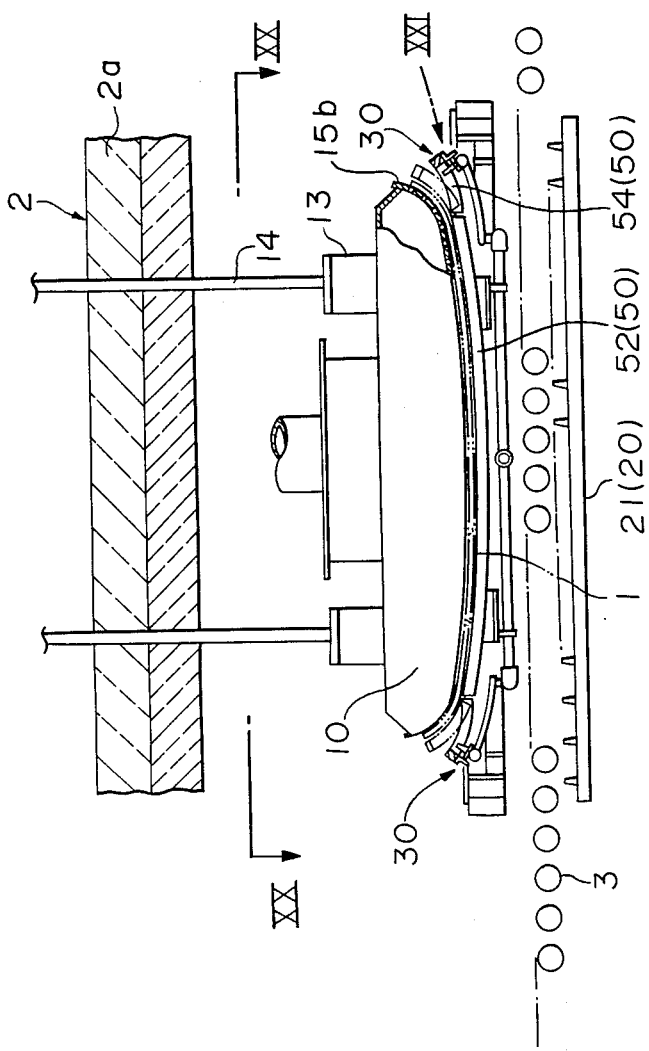
FIG. 19 is a front view partly cross sectioned of still another embodiment of the glass sheet bending apparatus according to the present invention.
Figure 20:
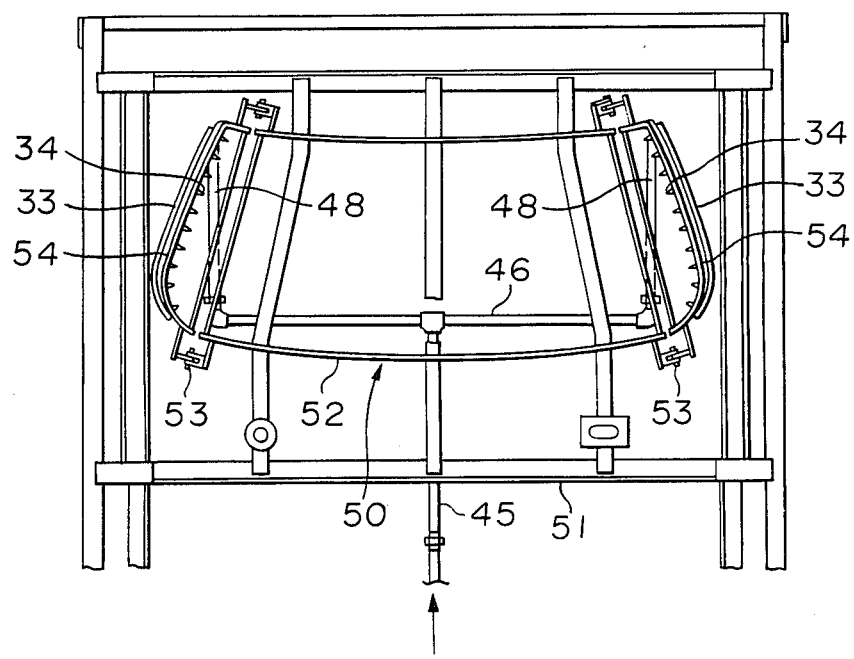
FIG. 20 is a cross-sectional view taken along a line XX—XX in FIG. 19.
Figure 21:
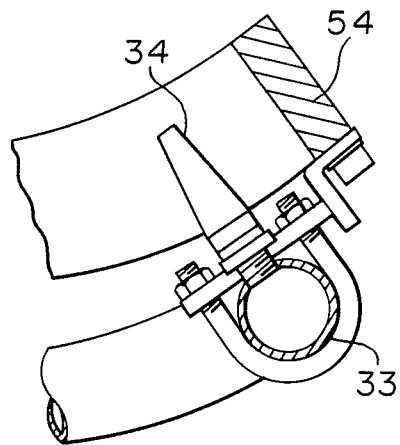
FIG. 21 is a diagram showing in detail the portion indicated by XXI in FIG. 19.
Figure 22:
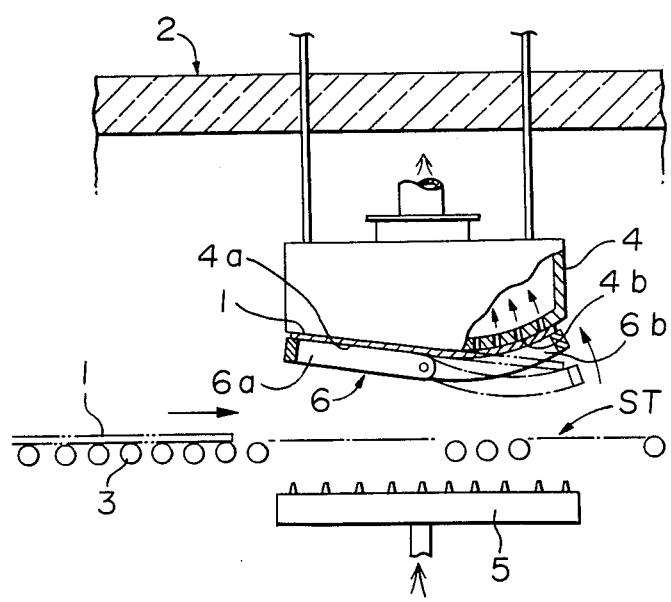
FIG. 22 is a diagram showing an example of a conventional glass sheet bending apparatus.

FIGS. 19 to 21 show a fourth embodiment of the present invention. The fourth embodiment has a different blow-bending device 30 from the third embodiment.

In the fourth embodiment, a branch piping 46 is connected to a piping 45 which is in turn, connected to a compressor (not shown). Blowing pipes 33 each having a number of blowing nozzles 34 are respectively connected to the branch piping 46 through respective flexible tubes 48. The blowing pipes 33 are respectively attached to the movable press rings 54 constituting the press-bending device 50 in such a manner that the blowing nozzles 34 do not project from the surfaces of the movable press rings 54.

In accordance with the fourth embodiment of the present invention, the angular position of the blowing nozzles 34 can be easily adjusted because the blowing nozzles 34 are arranged close to the deep-bending surfaces 15b in comparison with the third embodiment.

As described above, in accordance with the first and second embodiments of the glass sheet bending apparatus, the possibility of occurrence of scratches which may take place between a press-bending means and the side portions of the glass sheet during the deep-bending operations is reduced in comparison with a conventional apparatus in which the side portions of the glass sheet is directly deep-bent by means of the press-bending means; this being effected by blowing compressed air to the side portions of the glass sheet to bend it deeply. Accordingly, the quality of the deep-bent glass sheet can be kept in good condition. Further, the side portions of the glass sheet can certainly be deep-bent even when the side portions of the glass sheet are to be deeply bent because the side portions are pressed by means of the press-bending means after that portions are bent by blowing compressed air.

I claim:

1. A glass sheet bending apparatus for deep-bending a side of a glass sheet at a processing stage in a heating furnace, which comprises:

transferring means for transferring to said heating furnace said glass sheet heated to a temperature adapted for processing while keeping a horizontal posture, a mold having a curved surface with which said glass sheet is to be bend-shaped, said mold being arranged at a position corresponding to said processing stage, provisional shaping means for provisionally shaping said glass sheet by closely contact it on a generally curved surface in said mold excluding a deep-bending surface which corresponds to a deep-bent portion in said glass sheet, and blow-bending means for blowing compressed air to said deep-bending surface of the mold to bend part of said glass sheet so as to correspond to said deep-bending surface wherein said blow-bending means comprises at least one movable supporting means movable between an advanced blowing position and a retracted waiting position.

2. A glass sheet bending apparatus for deep-bending a side of a glass sheet at a processing stage in a heating furnace, which comprises:

transferring means for transferring to said heating furnace said glass sheet heated to a temperature adopted for processing while keeping a horizontal posture, a mold having a curved surface with which said glass sheet is to be bend-shaped, said mold being arranged at a position corresponding to said processing stage, provisional shaping means for provisionally shaping said glass sheet by closely contacting it on a generally curved surface in said mold excluding a deep-bending surface which corresponds to a deep-bent portion in said glass sheet, and blow-bending means for blowing compressed air to said deep-bending surface of the mold to bend part of said glass sheet so as to correspond to said deep-bending surface wherein said blow-bending means has blowing nozzles and wherein said at least one movable supporting means includes means for holding said blowing nozzles so that the mouth of the nozzles are directed to said mold, and for moving said blowing nozzles between an advanced blowing position and a retracted waiting position, depending on an operating position of said mold.

3. The glass sheet bending apparatus according to claim 1, wherein said blow-bending means includes means for blowing compressed air from said blowing nozzles to said glass sheet at a position where said mold is raised in said processing stage while said glass sheet is held by said mold by vacuum.

4. The glass sheet bending apparatus according to claim 1, wherein said blow-bending means comprises first and second sets of blow bending means provided at both sides of said mold at positions corresponding to deep-bending surfaces in said mold.

5. The glass sheet bending apparatus according to claim 2, wherein said movable supporting means has a piston rod, an operating bar fixed to the lower end of said piston rod to extend laterally, said operating bar holding said blowing nozzles and a link pivotally connected to said operating bar at one end fixed to said mold at the other end, whereby said blowing nozzles are moved so as to be close to or separated from said movable mold when said piston rod is operated.

6. The glass sheet bending apparatus according to claim 1, wherein said provional shaping means has a lift jet device arranged at the lower part of said processing stage and a suction device for causing an air-sucking force at a shaping surface in said mold.

7. A glass sheet bending apparatus for deep-bending a side of a glass sheet at a processing stage in a heating furnace, which comprises:

transferring means for transferring to said heating furnace said glass sheet heated to a temperature capable of processing while keeping a horizontal posture, a mold having a curved surface with which said glass sheet is to be bend-shaped, said mold being arranged at a position corresponding to said processing stage, provisional shaped means for provisionally shaping said glass sheet by closely contacting it on a generally curved surface in said mold excluding a deep-bending surface which corresponds to a deep-bent portion in said glass sheet, blow-bending means for blowing compressed air to said deep-bending surface of the mold to bend part of said glass sheet so as to correspond to said deep-bending surface, and press-bending means which is operated after bending operation by said blow-bending means is finished for pressing a side portion of said glass sheet so as to correspond to said deep-bending surface in said mold.

8. The glass sheet bending apparatus according to claim 7, wherein said blow-bending means comprises a plurality of blowing nozzles and at least one movable supporting means for holding said blowing nozzles so that the mouth of the nozzles are directed to said mold, and moving said blowing nozzles between an advanced blowing position and a retracted waiting position depending on an operating position of said mold.

9. The glass sheet bending apparatus according to claim 7, wherein said blow-bending means is integrated with said press-bending means.

* * * * *